US007140277B1

(12) United States Patent
Chern

(10) Patent No.: US 7,140,277 B1
(45) Date of Patent: Nov. 28, 2006

(54) DEVICE FOR QUICKLY RELEASING SOCKET FROM EXTENSION ROD

(76) Inventor: Shwu Ruu Chern, No. 1, Alley 16, Lane 40, Jinde Rd., East District, Taichung City 40141 (TW)

( * ) Notice: Subject to any disclaimer, the term of this patent is extended or adjusted under 35 U.S.C. 154(b) by 29 days.

(21) Appl. No.: 11/156,138

(22) Filed: Jun. 20, 2005

(51) Int. Cl.
*B25B 13/00* (2006.01)
*B25B 13/58* (2006.01)
*B25B 17/00* (2006.01)
*F16F 1/38* (2006.01)

(52) U.S. Cl. ................. 81/177.85; 81/180.1; 81/57.31; 403/324

(58) Field of Classification Search ............. 81/177.85, 81/180.1, 57.31, 58.1, 60–62; 403/324, 325
See application file for complete search history.

(56) References Cited

U.S. PATENT DOCUMENTS 4,399,722 A * 8/1983 Sardo, Jr. ....................... 81/60
4,865,485 A * 9/1989 Finnefrock, Sr. ......... 403/322.2
5,090,275 A * 2/1992 McCann .................. 81/177.85
5,214,986 A * 6/1993 Roberts .................... 81/177.85
5,233,892 A * 8/1993 Roberts .................... 81/177.85
5,477,434 A * 12/1995 Reed .......................... 362/119
5,503,048 A * 4/1996 Moon ...................... 81/177.85
5,509,333 A * 4/1996 Rion .......................... 81/180.1
6,523,441 B1 * 2/2003 Lee ........................ 81/177.85
6,736,034 B1 * 5/2004 Gonzales ................. 81/177.85
6,755,100 B1 * 6/2004 Chen ....................... 81/177.85

* cited by examiner

*Primary Examiner*—Lee D. Wilson
*Assistant Examiner*—Alvin J. Grant

(57) ABSTRACT

An extension rod includes a polygonal recess in a first end thereof and a polygonal connection end on a second end of the rod. An axial recess is defined in the second end of the rod and communicates with an inclined passage and a receiving hole in the connection end, a bead is partially received in the receiving hole. A spring is received in the axial recess and biases an end of a pull pin which is received in the axial recess. A collar is movably mounted to the rod and has a connection pin connected thereto which is inserted in the inclined passage and engaged with an engaging notch defined in the pull pin. The pull pin is pulled toward the second end of the rod to receive the bead in a receiving recess in the pull pin to quickly release the socket.

3 Claims, 8 Drawing Sheets

DEVICE FOR QUICKLY RELEASING SOCKET FROM EXTENSION ROD

FIELD OF THE INVENTION

The present invention relates to an extension rod having quick release device for easily and quickly releasing a socket connected to the extension rod.

BACKGROUND OF THE INVENTION

A conventional extension rod 1 is disclosed in FIG. 1, and generally includes an engaging recess 10 with which a driving stud of a wrench (both not shown) is engaged, and a connection end 11 which is a rectangular end with a bead 12 partially extending from one of sides of the connection end 11. The bead 12 is partially received in a recess in the side of the connection end 11 and a spring (not shown) is biased between the bead 12 and an inside of the recess in the connection end so that when a socket is mounted to the connection end 11, the bead 12 is engaged with an inside of the socket and position the socket on the connection end 11. However, when removing the socket from the object to be tightened, the socket usually securely mounted to the connection end 11 and the user has to pull the socket away from the connection end 11 of the extension rod 1. This takes time and is not advantageous for working in a narrow space.

The present invention intends to provide device for quickly releasing the socket from the connection end of the extension rod.

SUMMARY OF THE INVENTION

The present invention relates to an extension rod assembly which comprises an elongate rod having a polygonal recess defined in a first end thereof and a polygonal connection end on a second end of the rod. An inclined passage is defined in the rod and a receiving hole is defined in one of sides of the polygonal connection end. An axial recess is defined in the second end of the rod and communicates with the inclined passage and the receiving hole. A bead is partially received in the receiving hole. A spring is received in the axial recess and a first end of the spring is fixed in the axial recess and a second end of the spring is connected to an end of a pull pin which is received in the axial recess. The pull pin has an engaging notch and a receiving recess defined in an outer periphery thereof.

A collar is movably mounted to the rod and has an inclined hole defined in an inner periphery of the collar. A connection pin has a first end inserted in the inclined passage and engaged with the engaging notch. A second end of the connection pin extends through the inclined passage and is inserted in the inclined hole of the collar. The pull pin is pulled toward the second end of the rod and the bead drops in the receiving recess by moving the collar together with the connection pin.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
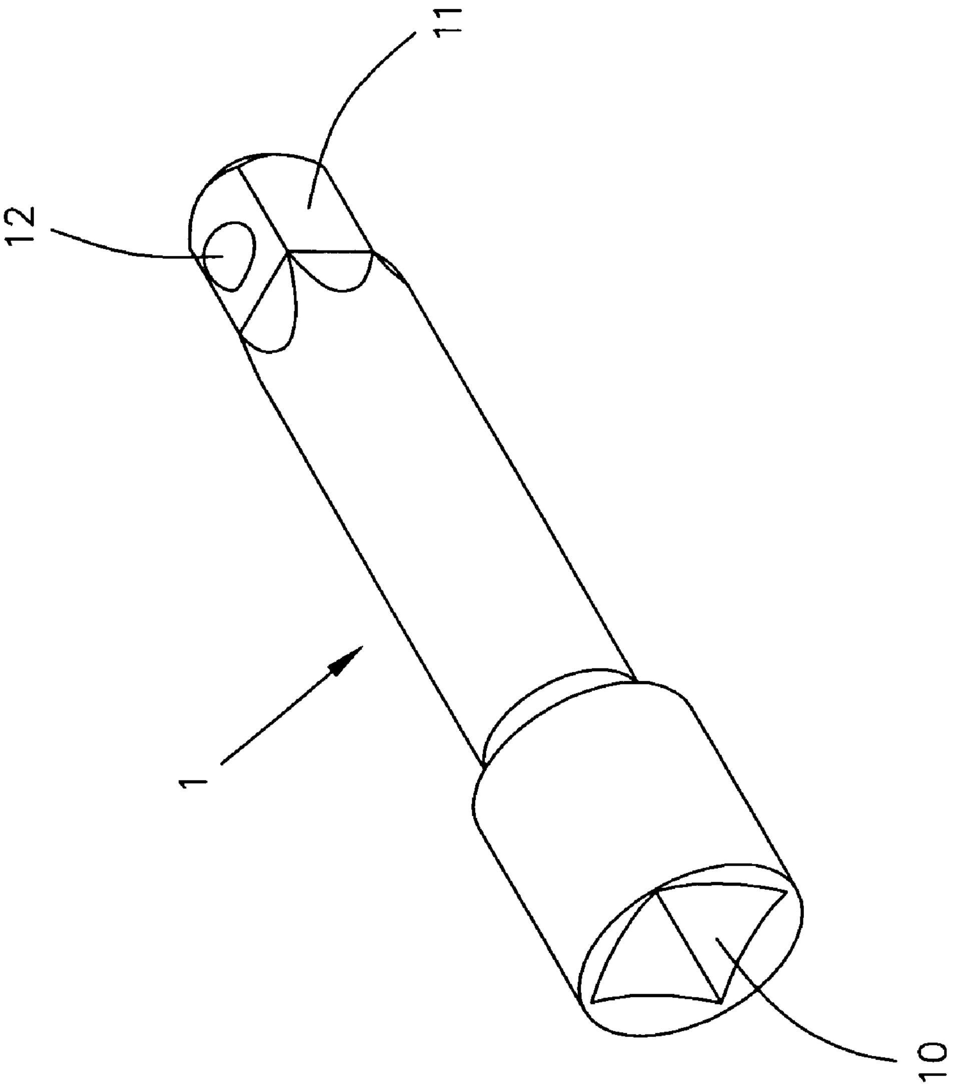
FIG.1 PRIOR ART
FIG. 1 shows a conventional extension rod.
Figure 2:
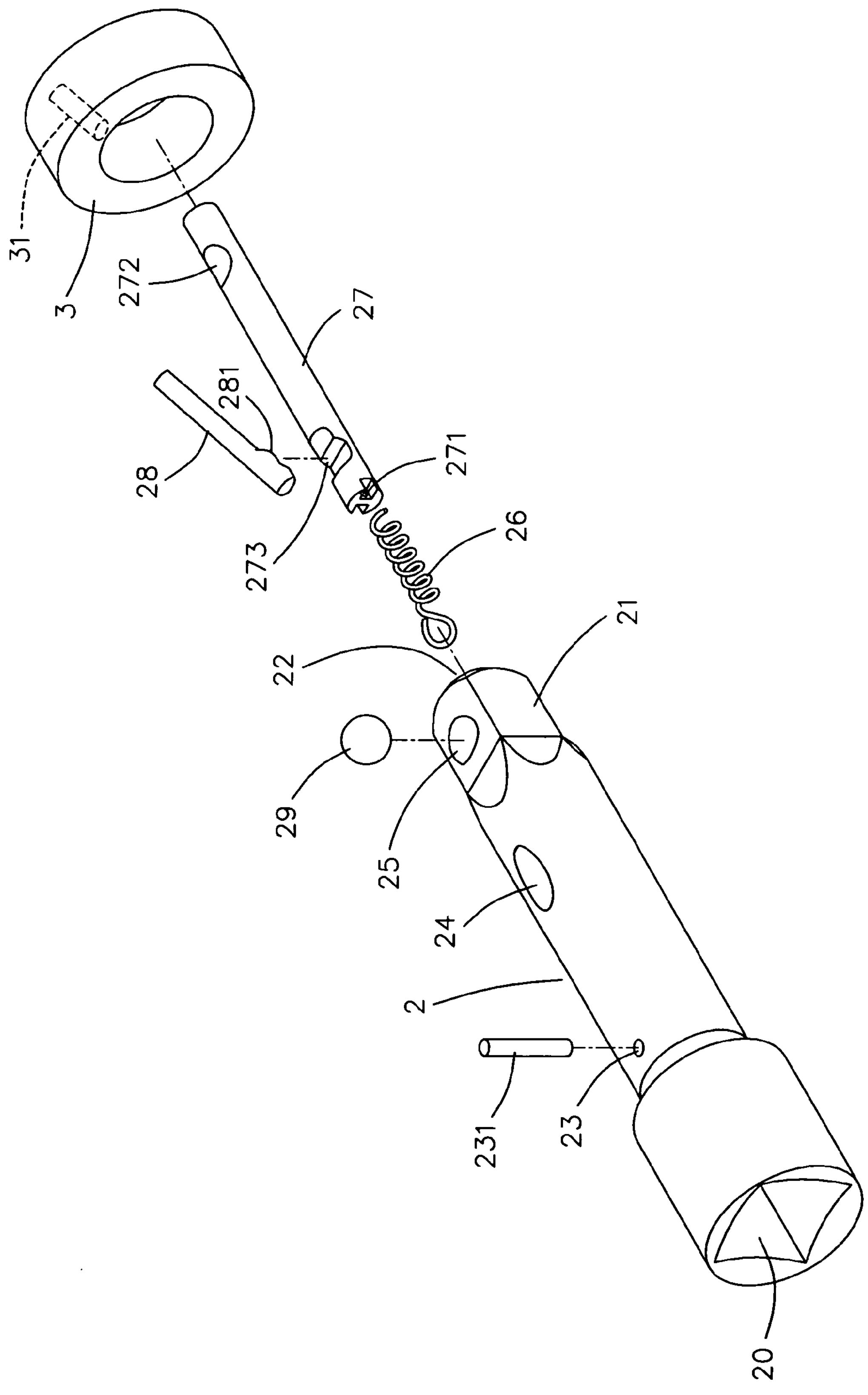
FIG. 2 is an exploded view to show the extension rod assembly of the present invention.
Figure 3:
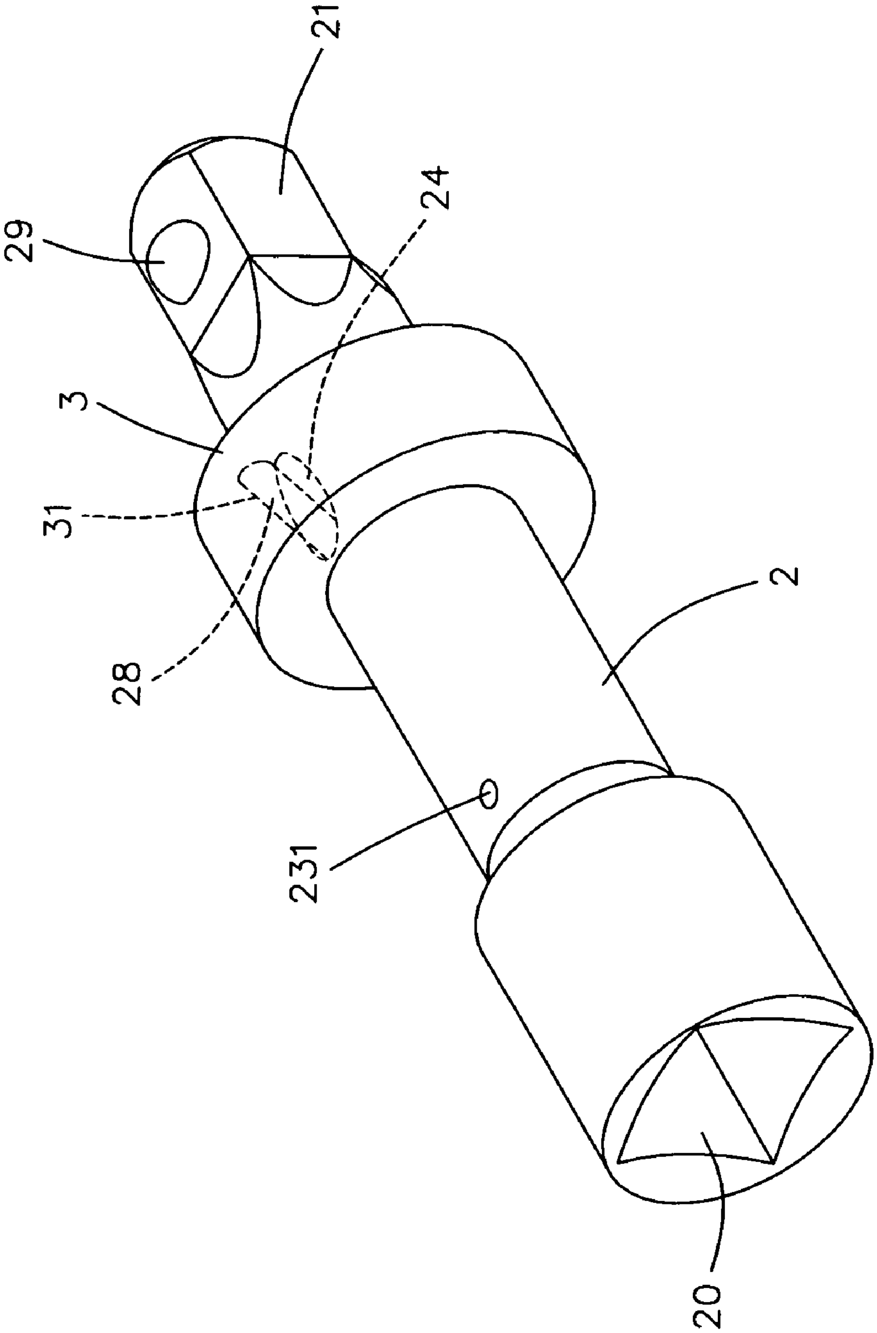
FIG. 3 is a perspective view to show the extension rod assembly of the present invention.
Figure 4:
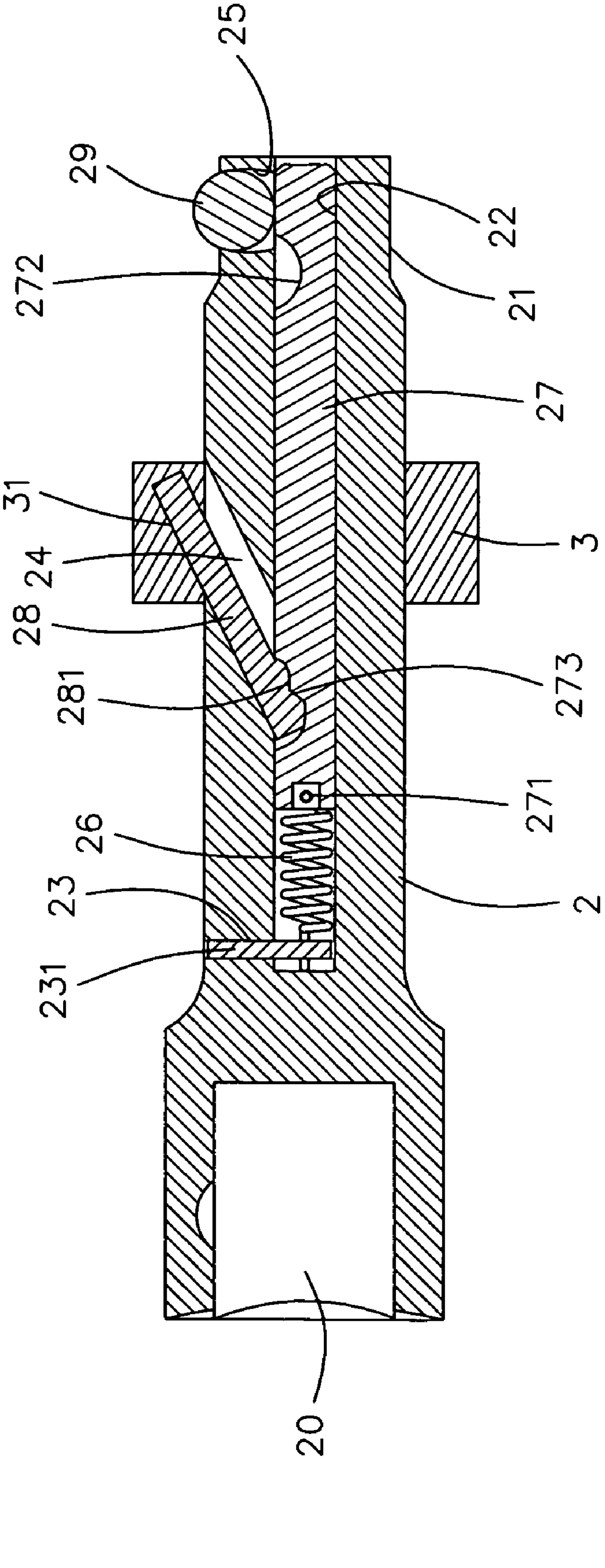
FIG. 4 is a cross sectional view to show the extension rod assembly of the present invention.

Referring to FIGS. 2 to 4, the extension rod assembly of the present invention comprises an elongate rod 2 having a polygonal recess 20 defined in a first end thereof and a polygonal connection end 21 on a second end of the rod 2. An inclined passage 24 and a radial passage 23 are defined in the rod 2. A receiving hole 25 is defined in one of sides of the polygonal connection end 21. An axial recess 22 is defined in the second end of the rod 2 and communicates with the radial passage 23, the inclined passage 24 and the receiving hole 25. A bead 29 is partially received in the receiving hole 25.

A spring 26 is received in the axial recess 22 and a first end of the spring 26 is a loop and a positioning pin 231 extends through the radial passage 23 and the loop. A second end of the spring 26 is hooked to a hole 271 defined through a first end of a pull pin 27 which is received in the axial recess 22. The pull pin 27 has an engaging notch 273 and a receiving recess 272 defined in an outer periphery thereof. The engaging notch 273 includes two stepped insides.

A collar 3 is movably mounted to the rod 2 and has an inclined hole 31 defined in an inner periphery of the collar 3. A connection pin 28 has a first end inserted in the inclined passage 24 and a protrusion 281 extends from an outer periphery of the connection pin 28 so that the protrusion is securely engaged with the engaging notch 273. A second end of the connection pin 28 extends through the inclined passage 24 and is inserted in the inclined hole 31 of the collar 3.

Figure 5:
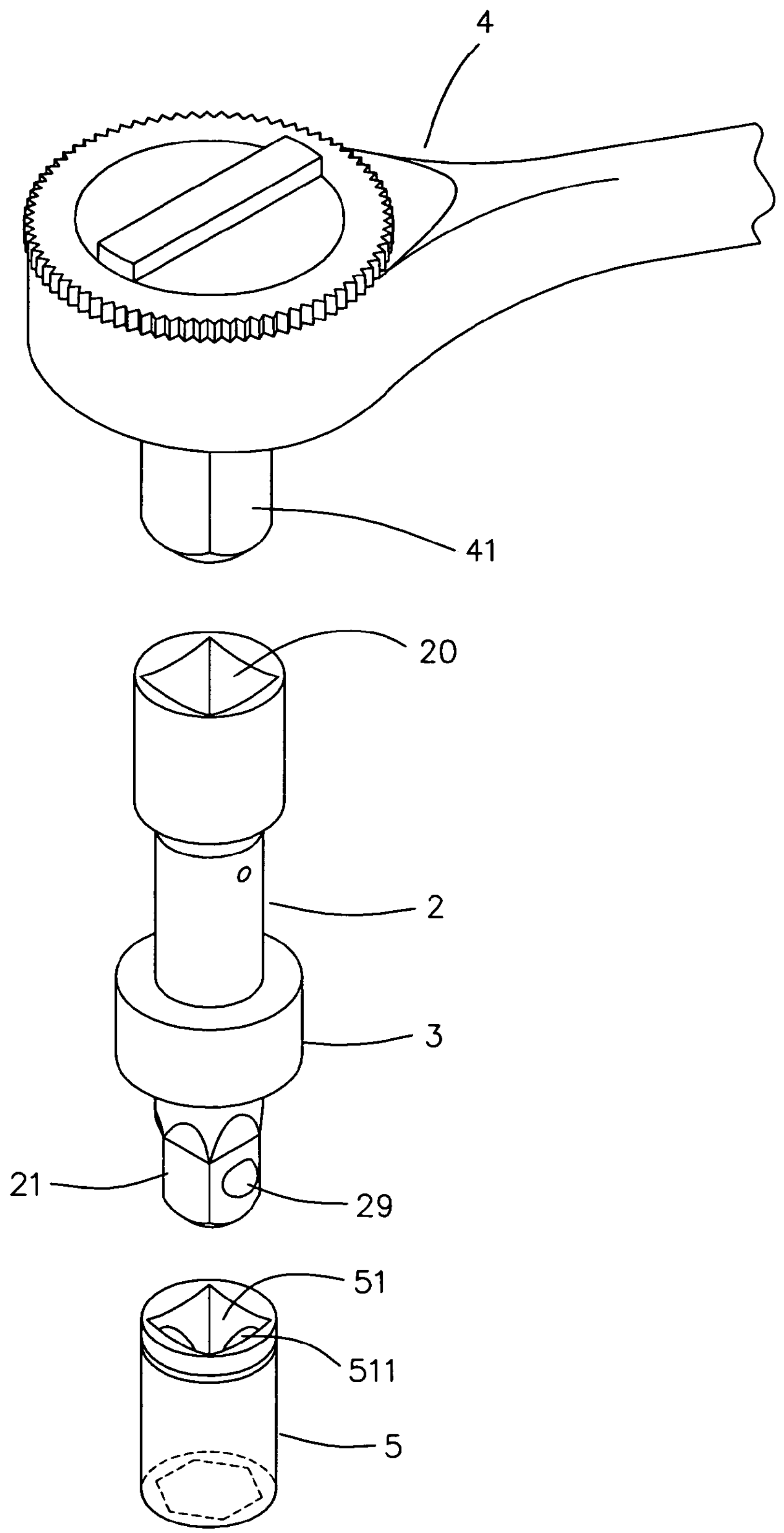
FIG. 5 shows a ratchet wrench, the extension rod assembly of the present invention and a socket.
Figure 6:
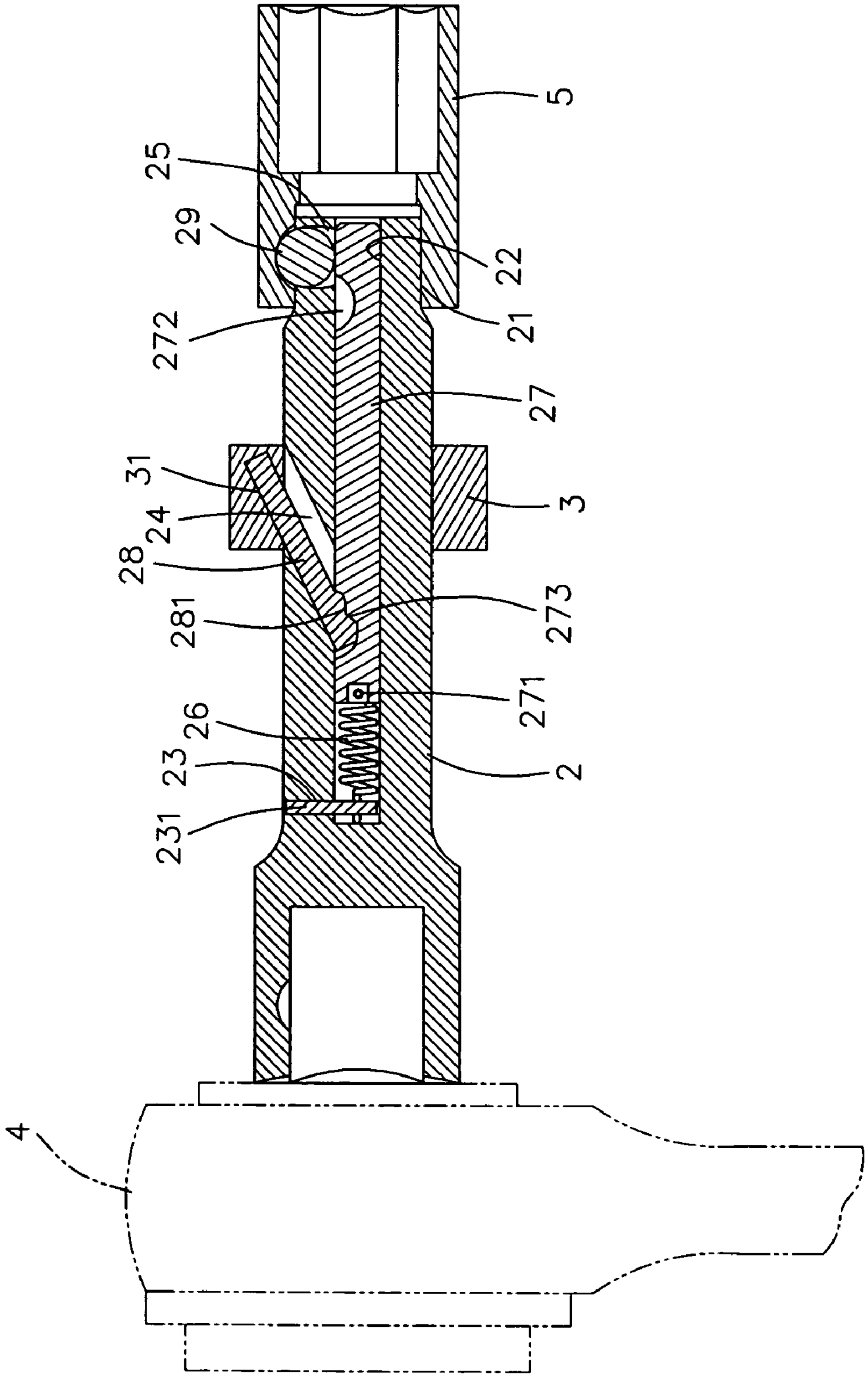
FIG. 6 is a cross sectional view to show that the ratchet wrench is connected to polygonal recess in the extension rod assembly of the present invention and a socket is mounted to the connection end of the extension rod.

As shown FIGS. 5 and 6, a driving stud 41 of a ratchet wrench 4 is engaged with the polygonal recess 20 of the rod 2 and a socket 5 is mounted to the connection end 21 of the rod 2 by the polygonal hole 51. The bead 29 is engaged with one of the notches 511 defined in an inner periphery of the polygonal hole 51 of the socket 5 so as to secure the socket 5 onto the connection end 21.

Figure 7:
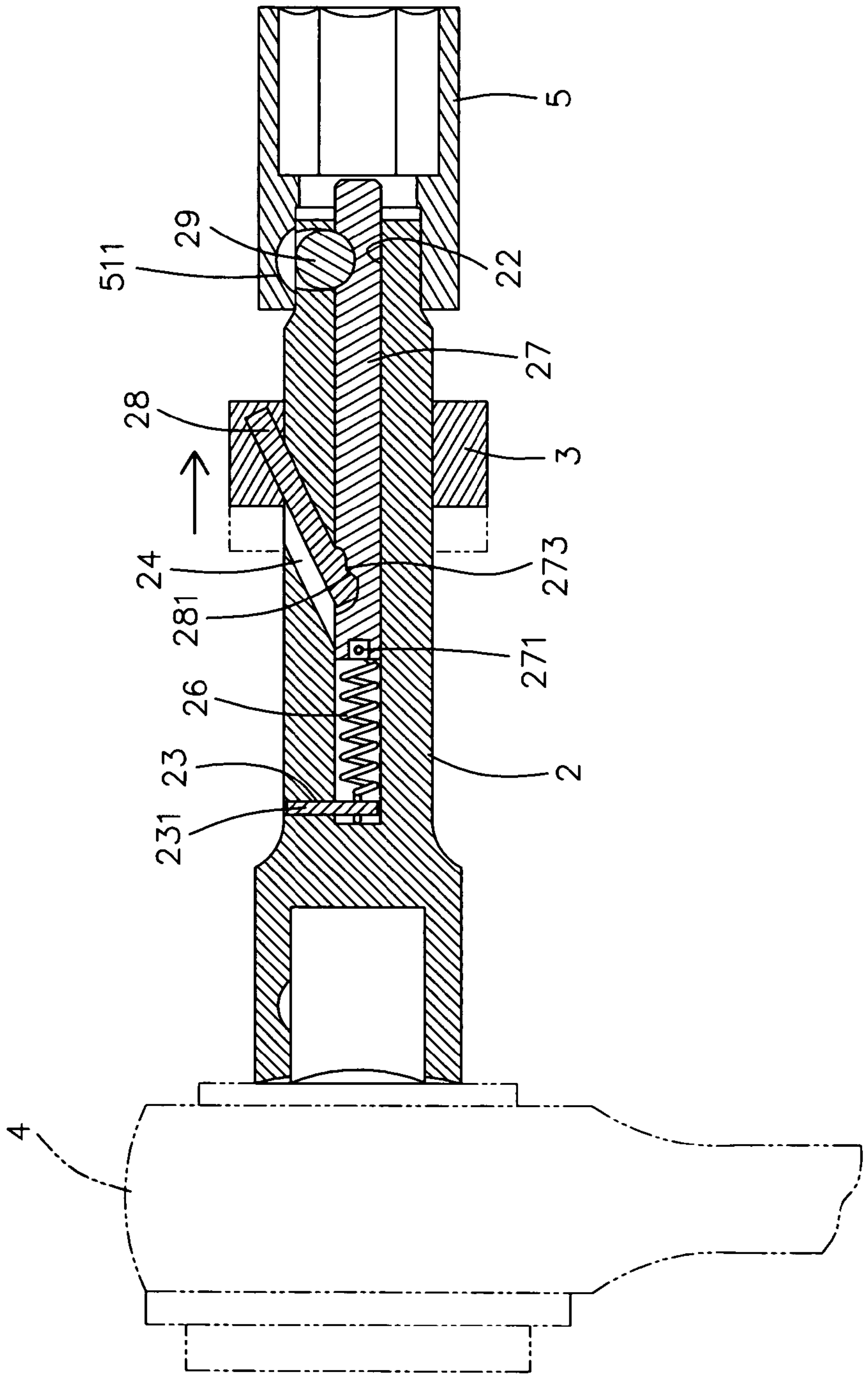
FIG. 7 shows the bead drops in the receiving recess by moving the collar.
Figure 8:
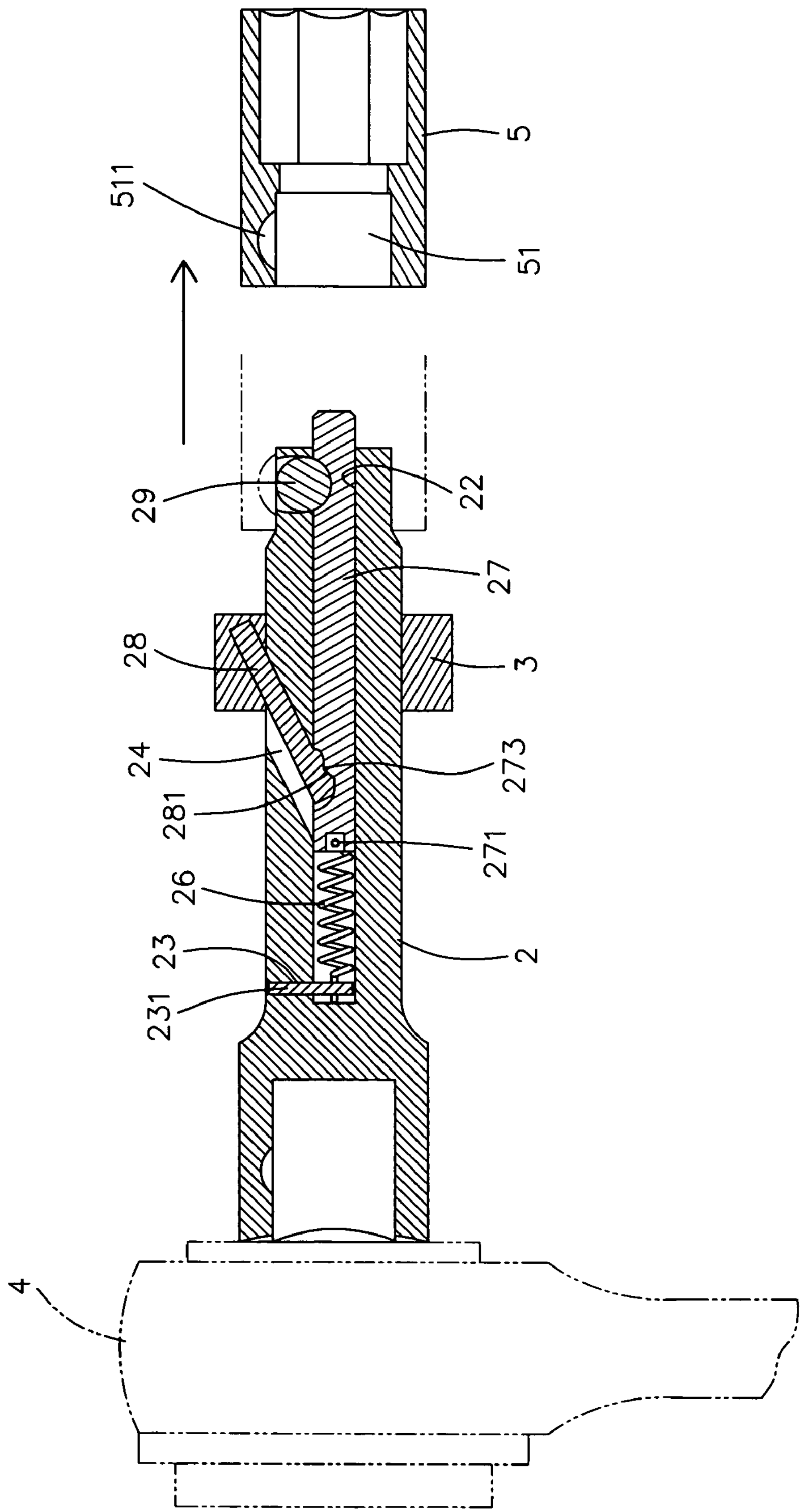
FIG. 8 shows that the socket is easily disengaged from the connection end of the extension rod.

As shown in FIGS. 7 and 8, when the user wants to remove the socket 5 from the connection end 21, he or she simply moves the collar 3 toward the socket 5, the pull pin 27 is pulled by the connection pin 28 and toward the second end of the rod 1. The bead 29 drops in the receiving recess 272 and is disengaged form the notch 511 in an inner periphery of the polygonal hole 51 of the socket 5 so that the socket 5 can be easily disengaged from the connection end 21.

While we have shown and described the embodiment in accordance with the present invention, it should be clear to those skilled in the art that further embodiments may be made without departing from the scope of the present invention.

What is claimed is:

1. An extension rod assembly comprising:

an elongate rod having a polygonal recess defined in a first end thereof and a polygonal connection end on a second end of the rod, an inclined passage defined in the rod and a receiving hole defined in one of sides of the polygonal connection end, an axial recess defined in the second end of the rod and communicating with the inclined passage and the receiving hole, a bead partially received in the receiving hole;

a spring received in the axial recess and a first end of the spring fixed in the axial recess and a second end of the spring connected to an end of a pull pin which is received in the axial recess, the pull pin having an engaging notch and a receiving recess defined in an outer periphery thereof, the engaging notch including two stepped insides;

a collar movably mounted to the rod and having an inclined hole defined in an inner periphery of the collar, and a connection pin having a first end inserted in the inclined passage and the first end of the connection pin having a protrusion which is securely engaged with the engaging notch, a second end of the connection pin extending trough the inclined passage and inserted in the inclined hole of the collar, the pull pin being pulled toward the second end of the rod and the bead dropping in the receiving recess by moving the collar together with the connection pin.

2. The assembly as claimed in claim 1, wherein a radial passage is defined in the rod and a positioning pin is inserted in the radial passage, the first end of the spring includes a loop in which the positioning pin extends.

3. The assembly as claimed in claim 1, wherein the first end of the pull pin has a hole defined therethrough and a second end of the spring is hooked with the hole.

* * * * *